Figure 3:
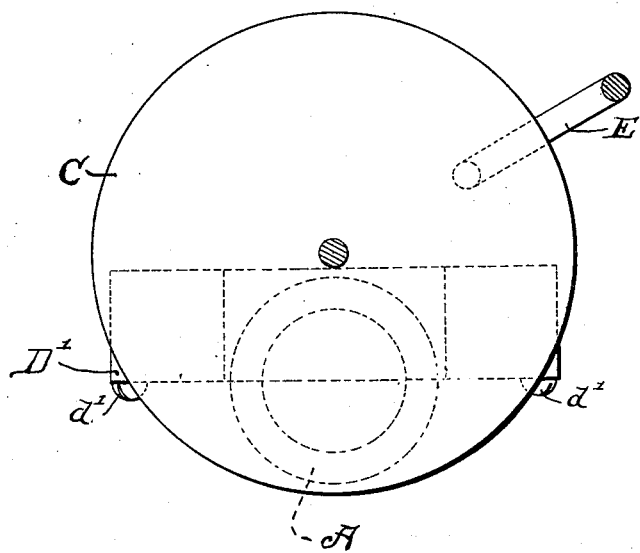

No. 698,668. Patented Apr. 29, 1902.
T. DUNCAN.
ELECTRIC METER.
(Application filed Nov. 10, 1899.)
(No Model.) 2 Sheets—Sheet 1.
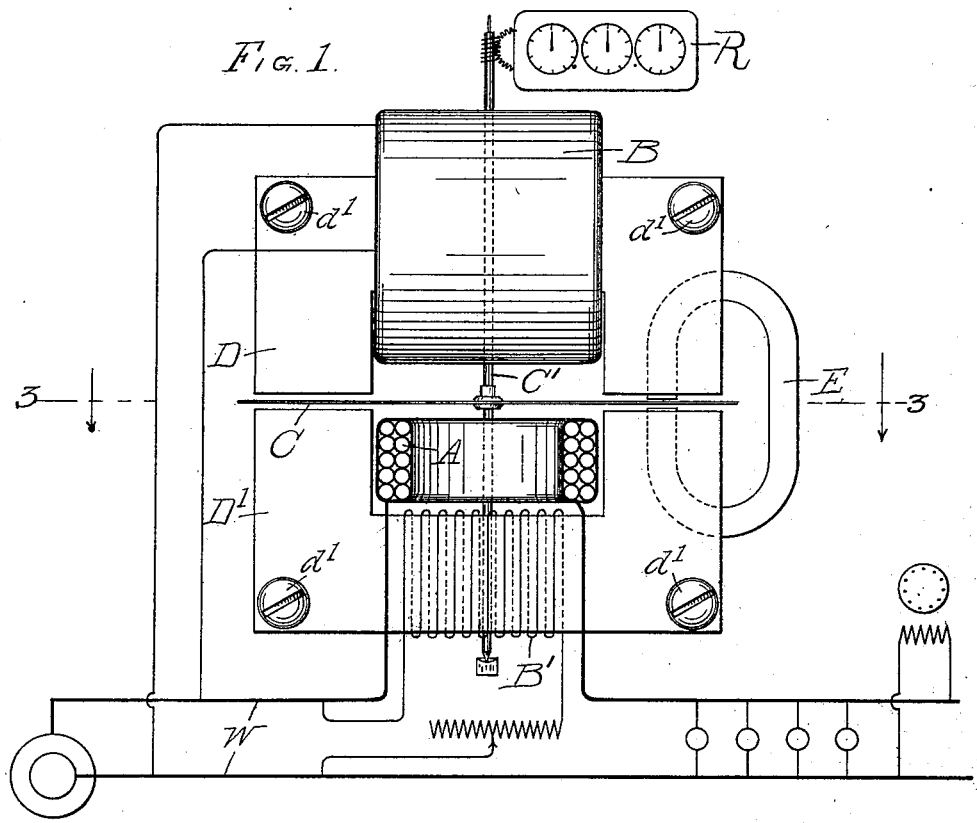
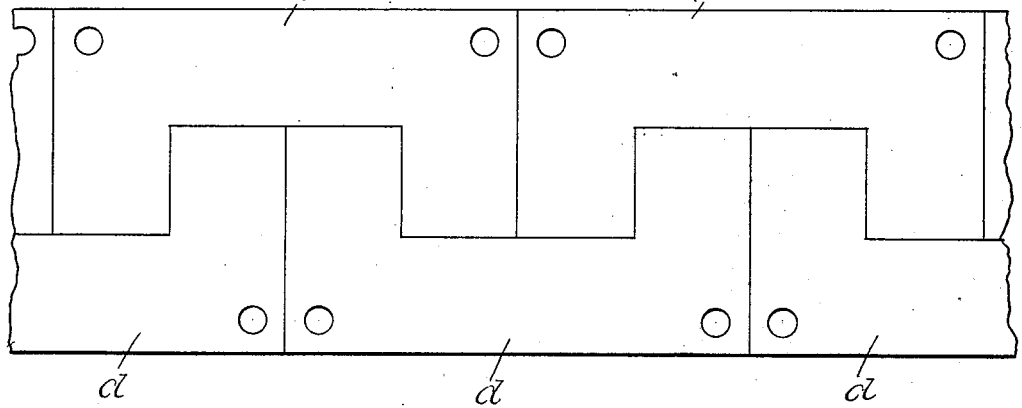
WITNESSES:
INVENTOR.
BY
ATTORNEYS No. 698,668. Patented Apr. 29, 1902.
T. DUNCAN.
ELECTRIC METER.
(Application filed Nov. 10, 1899.)

(No Model.) 2 Sheets—Sheet 2.

Witnesses:
Max W. Zabel.
Milton M. Alexander.

Inventor:
Thomas Duncan,
By Charles A. Brown & Cragg
Attorneys.

UNITED STATES PATENT OFFICE.

THOMAS DUNCAN, OF CHICAGO, ILLINOIS, ASSIGNOR TO THE SIEMENS & HALSKE ELECTRIC COMPANY OF AMERICA, OF CHICAGO, ILLINOIS, A CORPORATION OF ILLINOIS.

ELECTRIC METER.

SPECIFICATION forming part of Letters Patent No. 698,668, dated April 29, 1902.

Application filed November 10, 1899. Serial No. 736,488. (No model.)

*To all whom it may concern:*

Be it known that I, THOMAS DUNCAN, a citizen of the United States, and a resident of Chicago, in the county of Cook and State of Illinois, have invented certain new and useful Improvements in Electric Meters, (Case No. 66,) of which the following is a specification.

This invention relates to improvements in integrating wattmeters of the induction-motor type for use in alternating-current systems of electrical distribution.

The object of the invention is to produce a simplified design which will be capable of economical construction and which at the same time will be accurate in its measurements under all conditions and changes of service and load inductance.

In the accompanying drawings, Figure 1 is a front elevation, partially diagrammatic, of an integrating wattmeter embodying my improvement. Fig. 2 shows the manner in which the laminæ of the magnetic cores of the meter are punched from a sheet of metal without waste. Fig. 3 is a sectional view on line 3 3 of Fig. 1.

A designates the series field-coil of the meter, B its volt or shunt field-coil, and C a disk armature that is mounted to rotate freely upon a spindle C', to which an ordinary registering mechanism R is suitably geared. As herein shown, the volt-coil B is mounted above the armature upon the middle portion of an inverted-U-shaped magnetic core D, the downwardly-projecting poles of which terminate in close proximity to the upper surface of the armature C. A secondary magnetic core D', similar to the core D, is symmetrically arranged below the armature, with its poles projecting upwardly into close proximity to the under surface of the armature at points directly opposite the poles of the magnet D, and the series coil A is mounted below the armature between said poles of said magnet D', both the coils and the cores being located, as usual, away from the center of the armature, so that there is no interference with the spindle C', which, in the view shown in Fig. 1, passes behind said coils and cores, as shown in dotted lines in said figure. The coil A is centrally displaced relative to the magnet D'—that is, eccentrically mounted with respect to the central line passing through both poles of the magnet D', as shown most clearly in Fig. 3. The coil A is connected in series in the work-circuit W and the coil in shunt across the line, the self-inductance of the latter coil producing a phase displacement, by reason of which the armature will be inductively rotated. As will be understood by those skilled in the art, however, the lag produced by the core D will not amount to ninety degrees, and to increase such lag to the full quadrature necessary to accurate service under all conditions of load inductance an auxiliary volt-coil B' is mounted on the core D' and connected in shunt across the work-circuit W in a reverse direction to the main volt-coil B, with the effect of producing a resultant magnetic field lagging the full ninety degrees desired. The usual magnetic drag E serves to maintain the armature rotation proportional to the torque exerted.

In forming the cores D and D' U-shaped laminæ *d* are punched from sheet metal by a suitable punching-press and afterward assembled and secured together in any suitable manner, as by clamping-screws *d'*. These U-shaped punchings *d* are so shaped that when laid together in oppositely-directed pairs their pole-pieces will exactly interfit with each other, after the manner shown in Fig. 2, so that said laminæ may be punched from a strip of metal of proper width without any waste. In consequence of this mode of construction all waste of material in forming the laminated cores is done away with and the cost of manufacture thereby considerably lessened on this account. The novel form of meter thus provided is furthermore exceedingly simple and easy to manufacture at low cost in other particulars, while at the same time accurate and capable of satisfactory service under both inductive and non-inductive loads.

I claim as my invention—

An electric meter comprising the disk armature C, laminated cores D and D' arranged symmetrically upon the opposite sides of the armature with their poles in proximity thereto, volt field-coil B wound on one core, secondary volt-coil B' wound on the other core, and series field-coil A, mounted eccentrically to the poles of the cores, substantially as described.

In testimony that I claim the foregoing as my invention I affix my signature, in presence of two subscribing witnesses, this 7th day of November, A. D. 1899.

THOMAS DUNCAN.

Witnesses:
WM. F. MEYER,
J. W. MCKENZIE.